United States Patent [19]

Tepavcevic

[11] Patent Number: 5,113,113

[45] Date of Patent: May 12, 1992

[54] CONSTANT CURRENT RELUCTANCE MOTOR DRIVE SYSTEMS

[76] Inventor: Brane Tepavcevic, Jahorinska 24, 71 212 Hrasnica, Yugoslavia

[21] Appl. No.: 489,693

[22] Filed: Mar. 7, 1990

[51] Int. Cl.$^5$ .......................................... H02K 19/24
[52] U.S. Cl. .................................. 318/701; 318/138; 318/696
[58] Field of Search ............... 318/696, 700, 701, 721, 318/799

[56] References Cited

U.S. PATENT DOCUMENTS

| | | | |
|---|---|---|---|
| 3,974,434 | 8/1976 | Yablonski | 318/696 |
| 4,143,308 | 3/1979 | Deplante et al. | 318/701 |
| 4,297,626 | 10/1981 | Chiang | 318/696 |
| 4,450,396 | 5/1984 | Thornton | 318/696 |
| 4,670,696 | 6/1987 | Byrne et al. | 318/700 |

Primary Examiner—Stanley J. Witkowski
Assistant Examiner—John W. Cabeca

[57] ABSTRACT

An electric motor drive system comprised of a main winding providing energizing current in a rectilinear wave form. The wave form has energization intervals. The electric motor drive system is also comprised of an auxiliary winding providing a first spiked pulse and a second spiked pulse which oppose each other, and each of which have an essentilaly instantaneous leading edge corresponding to a given energization interval. In a preferred embodiment, the leading edge of the first spiked pulse corresponds to the rise of the corresponding energization interval, and the leading edge of the second spiked pulse corresponds to the fall of the energization interval.

10 Claims, 6 Drawing Sheets

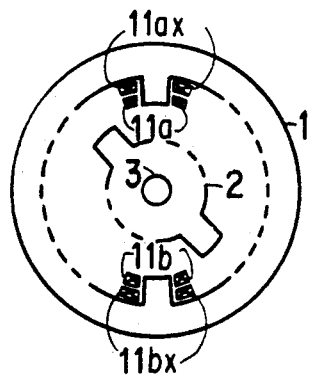
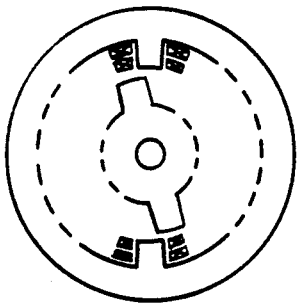
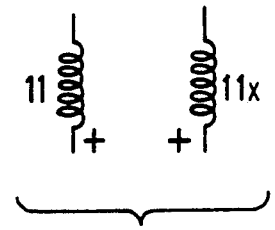
FIG. 1a  FIG. 1b  FIG. 1c
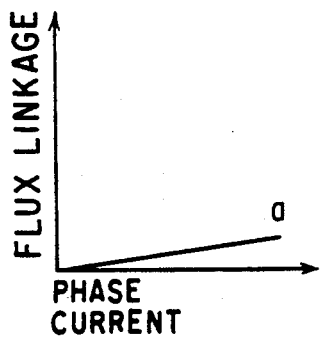
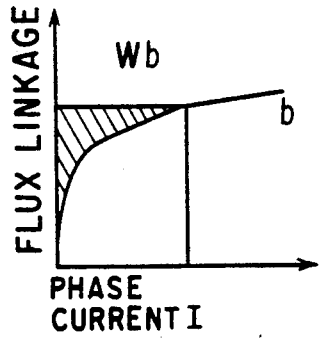
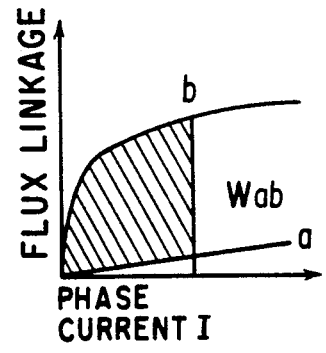
FIG. 2a  FIG. 2b  FIG. 2c
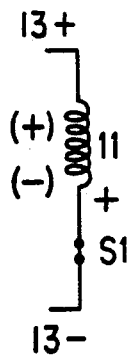
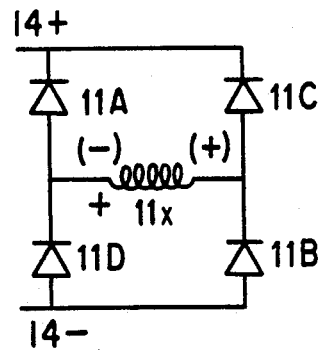
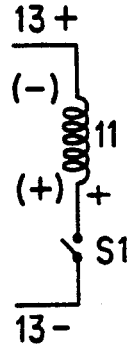
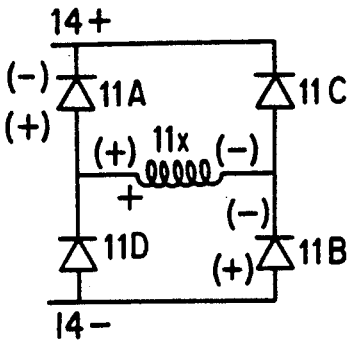
FIG. 3a  FIG. 3b  FIG. 4a  FIG. 4b

CONSTANT CURRENT RELUCTANCE MOTOR DRIVE SYSTEMS

FIELD OF THE INVENTION

This invention relates to electric drive systems comprising a variable reluctance (VR) motor having for each of n phases, where $n > 1$, a main winding with an auxiliary winding closely coupled to it, and a power converter for supplying unidirectional current pulses from a direct voltage source connected to it. The invention provides efficient and economical drive systems featuring controllable speeds and/or torques and incorporating conventional components.

BACKGROUND OF THE INVENTION

Electric drive systems include a variable reluctance motor, a power converter directing the power flow to main windings of the motor and an adjustable direct voltage source energizing the motor.

The VR motor can be either a VR motor incorporating n phases, where $n > 2$, and having for any rotor position at least one winding whereof the inductance increases with movement of the rotor in one direction and having for any rotor position at least one winding whereof the inductance decreases with movement of the rotor in said direction, yielding the motor to be reversible; or a VR motor being only one direction rotatable incorporating n phases, where $n > 1$, having for any rotor position at least one winding whereof the inductance increases with movement of the rotor in a given direction, and including a rotor whose each pair of poles is double off-center spiral, as disclosed in U.S. Pat. No. 3,679,953 from Jul. 25, 1972 for a two phase motor. The motor phases compose either one or more groups in such a way that each group includes for any rotor position at least one phase whereof the winding inductance substantially increases with movement of the rotor, and where each phase belongs to only one group.

A power converter energizes a phase at rotor positions wherein the winding inductance substantially increases with movement of the rotor. The phase is energized by applying a direct voltage to its main winding throughout the energizing interval. The energization interval of a phase starts at the rotor position, called switch-on point, where the winding inductance is at its substantial minimum and ends at the rotor position, called commutation point, where the winding inductance is either equal to or smaller than its maximum and where the winding inductance of the other phase of the same group is at its substantial minimum and where the said other phase is to be energized. Such operation of a power converter provides the successive energizing of the phases composing a group, one by one and only one at any instant of time, except near the commutation point where a certain overlapping occurs due to switching technique. A power converter supplies unidirectional current pulse to a main winding during energization interval. The supplied current pulse has rectilinear waveform whose main feature is the instantaneous change of the current at the beginning and at the end of the interval. Each instantaneous change of the main winding current is interrelated to the instantaneous change of the auxiliary winding current.

The basic feature of a current flowing through an auxiliary winding are two short pulses having directions opposing each other. The auxiliary winding current changes instantaneously to the certain level at the beginning of each pulse and thereafter it smoothly changes to zero.

The first pulse is interrelated to the rise of the main winding current at the beginning of the interval and it produces the magnetic flux opposing the flux being produced by the main winding current. The second pulse is interrelated to the instantaneous collapse of the main winding current and it maintains the decreasing flux previously established by the main winding current.

The above described waveshapes are the basic features of the drives and distinguish the drive systems being subject matter of this invention from the well known systems.

SUMMARY OF THE INVENTION

The present invention pertains to an electric motor drive system. The electric motor drive system is comprised of a main winding providing energizing current in a rectilinear wave form. The wave form has energization intervals. The electric motor drive system is also comprised of an auxiliary winding providing a first spiked pulse and a second spiked pulse which oppose each other, and each of which have an essentially instantaneous leading edge corresponding to a given energization interval. In a preferred embodiment, the leading edge of the first spiked pulse corresponds to the rise of the corresponding energization interval, and the leading edge of the second spiked pulse corresponds to the fall of the energization interval.

BRIEF DESCRIPTION OF THE DRAWINGS

In the accompanying drawings, the preferred embodiments of the invention and preferred methods of practicing the invention are illustrated in which:

FIG. 1a. and 1b. show a schematic end view of the section of a VR motor for two different rotor positions and the section includes one pair of the stator poles, one pair of the main and one pair of the auxiliary windings coils, both shown in cross section, and further includes one pair of the rotor poles being the nearest ones to the stator poles for the rotor position as pictured;

FIG. 1c. shows by the example how one pair of the main windings is represented as one winding 11, and how one pair of the auxiliary windings is represented as one winding 11x; a current flowing out of the +terminal of a main winding produces the flux overlapping the flux produced by a current flowing out of the + terminal of the accompanied auxiliary winding;

FIG. 2a. shows a magnetization curve corresponding to a rotor position where the magnetic material is not saturated;

FIG. 2b. shows a magnetization curve corresponding to a rotor position where the magnetic material is saturated, and also further shows the graphical representation of the stored energy for the given rotor position when the phase carries a current I; the energy is represented by the hatch area Wb;

FIG. 2c. shows the graphical representation of mechanical energy converted by a phase carrying a constant current during the movement of the rotor between two positions featuring the given magnetization curves a and b respectively; the converted energy is represented as the hatched area Wab;

FIG. 3a., FIG. 3b. illustrate the operation of the phase by showing the polarities of the relevant voltages, the polarities are given in the brackets, when direct voltage is applied to the main winding, and when the auxiliary winding carries no current; the FIGS. show respectively the main, the auxiliary winding, together with accompanied circuit means being relevant for the illustrated operation;

Figure 5A:
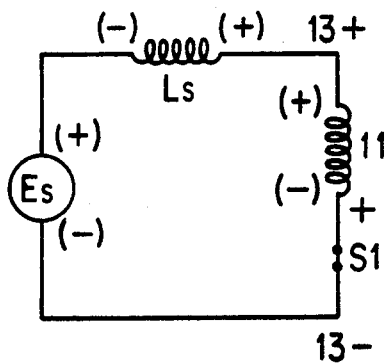
Figure 5B:
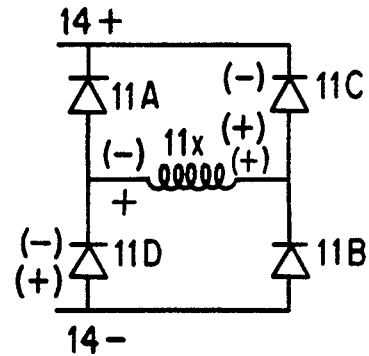
Figure 6A:
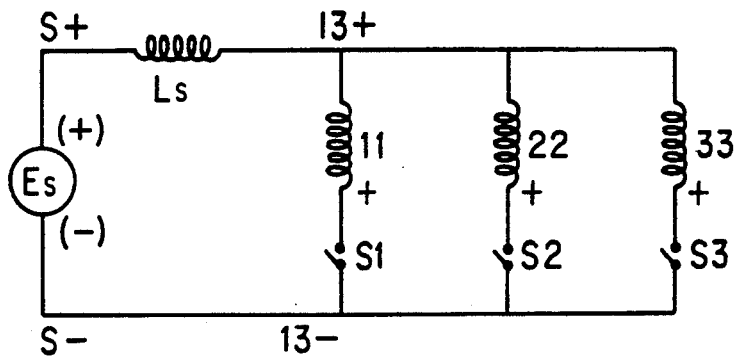
Figure 6B:
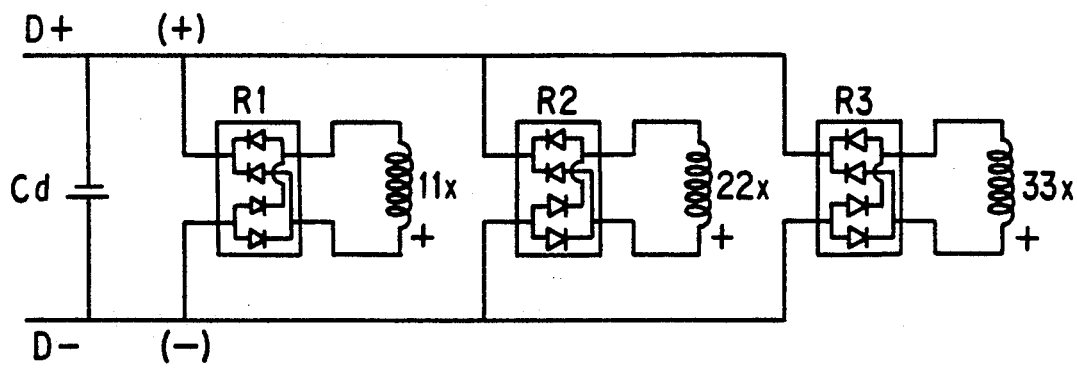
Figure 6C:
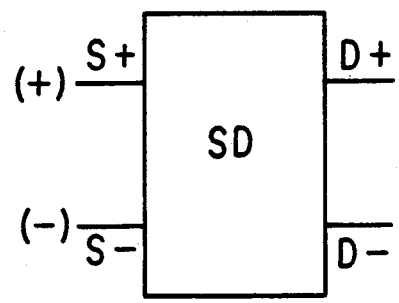
Figure 6D:
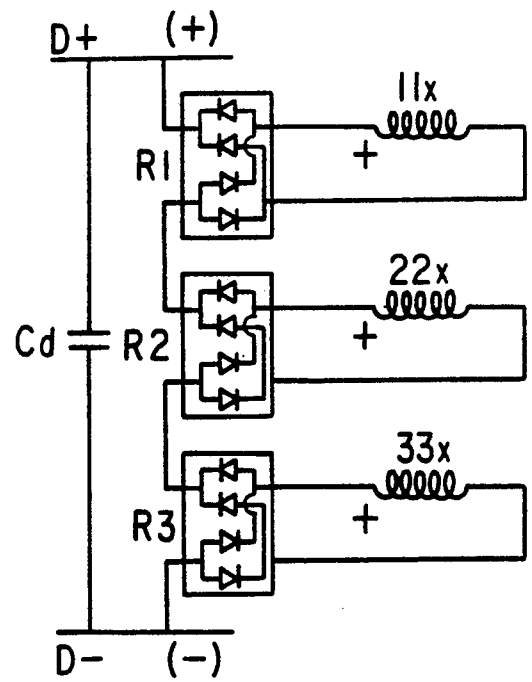
Figure 7A:
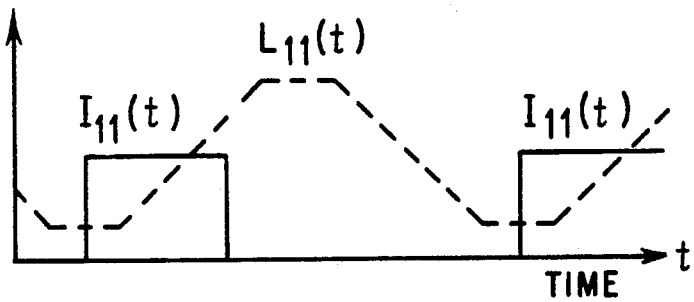
Figure 7B:
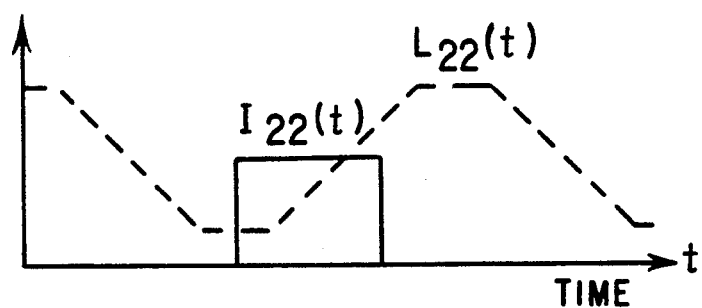
Figure 7C:
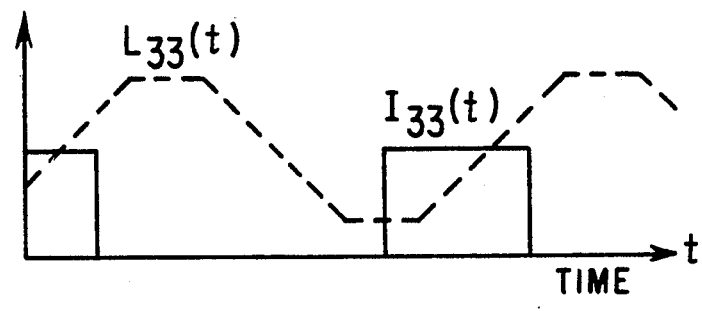
Figure 8A:
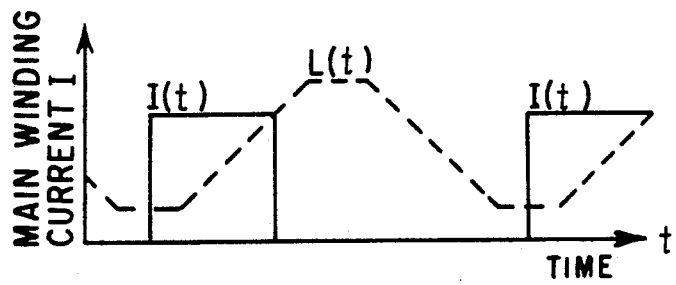
Figure 9A:
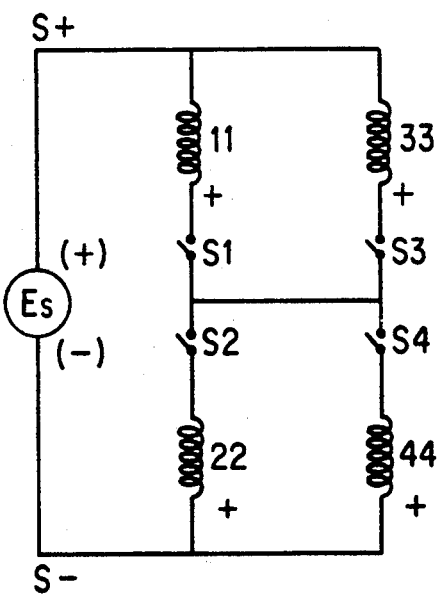
Figure 9B:
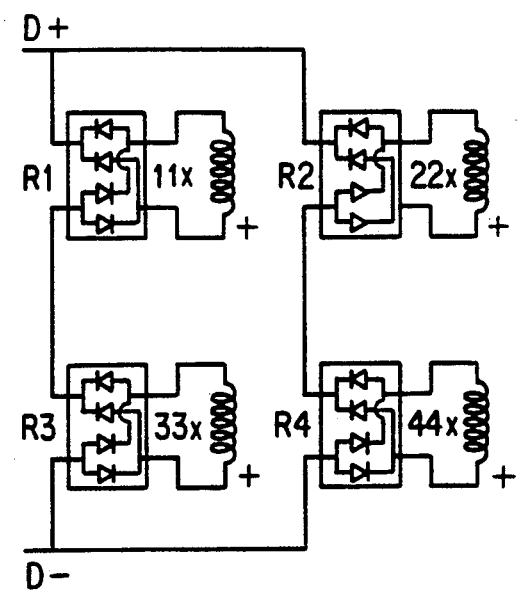
Figure 9C:
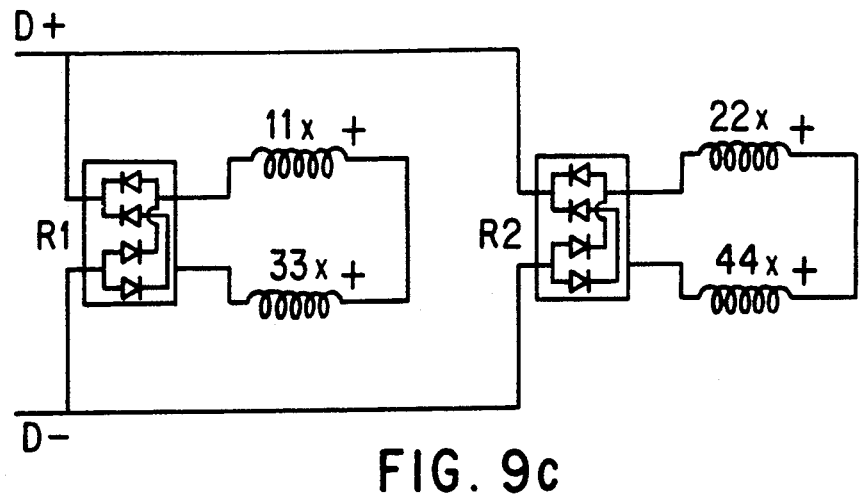
Figure 10:
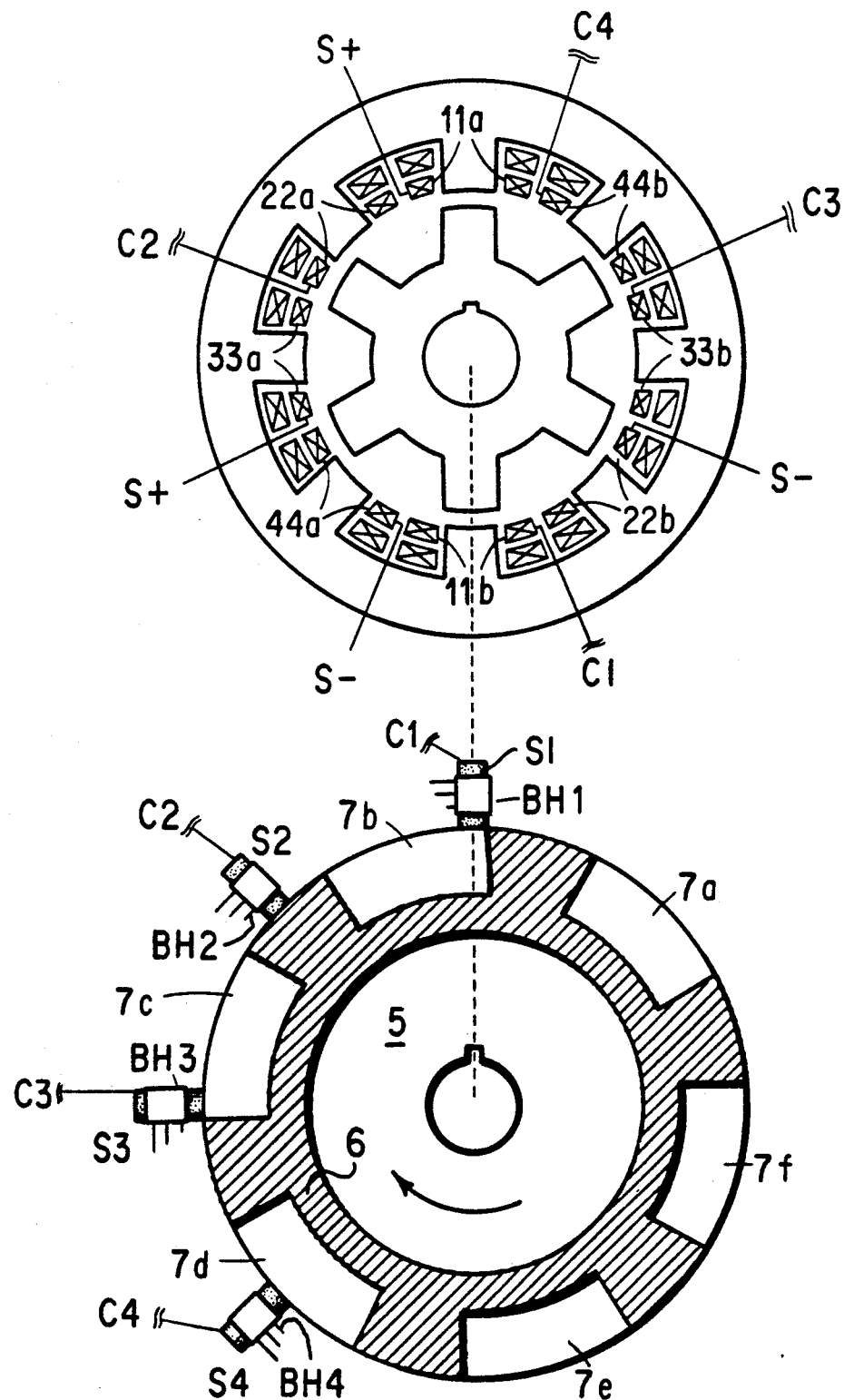

The pair FIG. 3a., FIG. 3b. is similar to the pairs FIG. 4a., FIG. 4b and FIG 5a., FIG. 5b. illustrating the operation of the same phase respectively when the stored energy is being discharged by means of the auxiliary winding, as illustrated in the pair FIG. 4a., FIG. 4b. and when the power is transferred into the main and out of the auxiliary winding simultaneously, as illustrated in the pair FIG. 5a., FIG. 5b.;

FIG. 6a. is a schematic circuit diagram of the control circuit for energizing the main windings of a three phase VR motor;

FIG. 6b. and FIG. 6d. are circuit diagrams of two different embodiments of a rectifying circuit enabling the power transfer from the auxiliary winding of three phase VR motor;

FIG. 6c. shows a direct to direct voltage converter represented as the black box with its terminals;

FIGS. 7a., 7b and 7c. show the waveshape of the current flowing through the main windings of three phase VR motor respectively;

FIGS. 8a. and 8b. show the waveshape of the current flowing through the main and auxiliary winding of VR motor respectively;

FIG. 9a. is a schematic circuit diagram of the control circuit for energizing the main winding of a four phase VR motor;

FIGS. 9b and 9c. are two embodiments of the circuit enabling power transfer from the auxiliary windings of four phase VR motor;

FIGS. 9b to 9g. show the waveshape of the current flowing through the main windings of four phase vR motor together with respective winding inductance curves;

FIG. 10. shows end view of the slip ring operating as switching means providing energization of the main windings of four phase motor.

DESCRIPTION OF THE PREFERRED EMBODIMENT

The principle of operation of a VR motor is related to the magnetomotive force (MMF) producing magnetic flux in the magnetic circuit having two high permeability members, a stationary and a movable one. The flux tends to minimize the reluctance offered to the MMF by the air gaps between the members. FIG. 1a. and FIG. 1b. illustrate the operation of the phase of a typical VR motor where the stator 1 has inward salient poles equipped with the pair, 11a and 11b, of the main windings and with the pair, 11ax and 11bx, of the auxiliary windings; where the movable member is the rotor 2, mounted on the shaft 3.

The rotor poles can be either symmetrical ones as shown or a double off-center spiral, however the air gap between the stator and the nearest rotor pole decreases with the movement of the rotor between two positions as illustrated in FIG. 1a. and FIG. 1b., and the flux excited by the main winding current during such movement produces torque mostly supporting said movement.

The auxiliary winding either carries the returning current maintaining decreasing flux after commutation point, or operates, as will be explained, at the beginning of the energization interval as the secondary of the transformer whose primary is the main winding. The resultant MMF of a phase of a VR motor is the algebraic sum of the amperwindings of the main winding and of the amperwindings of the auxiliary winding. The resultant magnetic flux, produced by a phase, is related to MMF and the well-known relations is given by $$N*I + Nx*Ix = (Reluctance)*(Resultant\ Flux).$$

where I is the current flowing out of the +terminal of the main winding having N turns and where Ix is the current flowing out of the + terminal of the auxiliary winding having Nx turns. The same relation is also given by $$N*If = (Reluctance)*(Resultant\ Flux)$$

where If is the phase current given by If=I+(Nx/N)*Ix. It is well-known that neither the resultant flux nor the resultant MMF change instantaneously. Therefore the instantaneous change of the main winding current is possible only if it is accompanied by the instantaneous change of the current in the auxiliary winding in such way that the resultant MMF remains unchanged at the given instant of time.

The varying magnetic flux F produces an induced voltage E between the terminals of the main winding and the voltage Ex between the terminals of the auxiliary winding, of value determined by Faraday's law respectively E=N*dF/dt, Ex=Nx*dF/dt.

This yields the voltage ratio to be given by E:Ex=N:Nx. When the magnetic permeability is constant and when the auxiliary winding carries no current the voltage E across the main winding is given by the well-known relation $$E = d(Li)/dt,$$

where L is the inductance of the main winding, and i is the main winding current, yielding further the well-known relation concerning electromechanical energy conversion given by $$E = L(di/dt) + i(dL/dt).$$

The flows of energy into the main and/or out of the auxiliary winding of a phase are enabled by the respective circuit means. The operation of a phase is going to be explained by way of example of the main, 11, and the auxiliary, 11x, winding composing the phase. The motor speed is substantially constant and the load remains unchanged. The speed fluctuations occur due to uneveness of the torque but the fluctuations are assumed to be small compared with the base speed. The winding resistance is assumed to be negligible. The sections of the circuit diagrams relevant for the operation of the phase are shown in FIG. 3a. and in FIG. 3b.

The schematic circuit diagram shown in FIG. 3a. includes the main winding 11, the series connected switch S1 and the terminals of the energizing direct voltage source. The positive terminal, 13+ and the negative one, 13−, are the nodes of the external circuit whose feature is that it produces substantially constant current flowing through the load connected between the said terminals. The load is only one main winding and, when switch S1 is conductive, the main winding 11 is energized. The waveshape of the current is substantially not influenced by the uneveness of the back electromotive force of the main winding. Therefore the MMF of the main winding is mostly constant. The voltage between the source terminals, when the auxiliary winding carries no current, fits nearly perfectly to the waveshape of the back electromotive force of the winding for the given constant current and the given speed of the motor.

The switching means S1 can be either a conventional solid state switch or a more traditional switch. The circuit diagram concerning the operation of the auxiliary winding is shown in FIG. 3b. and it includes the auxiliary winding 11x, two pairs of uncontrolled rectifiers, the pair 11A, 11B and the pair 11C, 11D, and the terminals of the direct voltage source the positive, 14+, and the negative one 14−.

The direct voltage source is the sink for the current flowing through the winding 11x when one pair of rectifiers is forward biased. The mentioned source is called the dump source. When the magnitude of the voltage across the auxiliary winding is higher than the voltage between the terminals 14+ and 14− one pair of the rectifiers is forward biased and the current starts to flow through the winding. Which one of pairs is conductive it depends on the polarity of the voltage across the auxiliary winding 11x. The voltage magnitude between the terminals 14+ and 14− is such that the transfer of power from the auxiliary winding occurs only when the voltage across the main winding is higher than the maximum of the back electromotive force of the winding for the rated motor speed. The current flow through the auxiliary winding is related only to the current changes in the main winding. The uncontrolled rectifiers accompanying an auxiliary winding compose a single phase full wave rectifier readily available as a single block, further called rectifier.

Three patterns of energy flow feature the operation of a phase and occur: when some or the whole power being transferred to the main winding power is transformed and returned to a supply by means of the auxiliary winding, when the power is transferred to the mainwinding and when the stored energy is being discharged by means of the auxiliary winding.

After commutation point the current flowing out of the + terminal of the auxiliary winding maintains the decreasing flux and the stored energy is being transferred to the supply through the rectifier pair 11A, 11B. The polarity of the voltage across the main and across the auxiliary winding, while stored energy is being discharged, are given in FIG. 4a., FIG. 4b. respectively, as well as polarity across the forward biased rectifier pair in FIG. 4b.

Higher voltage of the source provides greater value of the returning power yielding shorter current pulse in the auxiliary winding.

When the power is transferred to the main winding, and when the auxiliary winding carries no current than the energy is taken from the source and converted into magnetic energy of the winding in the well-known way. As the air gap between the stator and the nearest rotor pole decreases so the reluctance decreases substantially and the resultant flux rises substantially. The polarity of the voltage across the main and across the auxiliary winding while the flux rises is given in FIG. 3a., FIG. 3b. respectively. When the main winding current is constant and when the auxiliary winding carries no current the relation concerning electromechanical energy conversion can be written as $E = IdL/dt$ and further substituting $dL/dt = (dL/dq)(dq/dt)$ and $w = dq/dt$, the relation is given by $E = I(dL/dq)w$ where L is the main winding inductance, q is angular displacement of the rotor and w is the angular speed of the motor.

The instantaneous value of the voltage across a main winding at a certain rotor position, under previously stated conditions, is proportional to the angular speed of the rotor and therefore the average voltage across the main winding during the movement of the rotor between two positions, under the same conditions, is proportional to the angular speed of the rotor. During the energization interval the phase operates mostly with constant current in the main and no current in the auxiliary winding and therefore the average value of the voltage between the terminals of a main winding during the interval is mostly proportional to the motor speed.

Immediately, after applying a direct voltage to the main winding there's neither excited flux nor the resultant MMF. When the direct voltage E is applied to the main winding and when the auxiliary winding carries no current, as at well-known systems, the main winding current changes in accordance to the energy-conversion relation. The switch-on point is chosen in such way that the winding inductance is at its substantial minimum and remains mostly unchanged during the establishing of the current, yielding the energy conversion relation to be given by $$E = L(di/dt)$$

where E is the applied voltage, L is main winding inductance and i is the main winding current. The given relation is also valid in case when the current of value $(i + I)$ flows out of the + terminal of the main winding, when the current Ix flows into the + terminal of the auxiliary winding and when the fraction I of the main winding is compensated by the auxiliary winding current Ix in such a way that is $$NI - NxIx = 0,$$

yielding the resultant MMF to be dependent only on the fraction of the main winding current i. This is the well-known with the operation of a transformer, where the primary and secondary current compensate each other, while the voltage across the windings is maintained by the exciting current.

In the system being the subject matter of this invention, the main winding is connected between the nodes of the circuit forcing the current to flow through the connected main winding. The section of the schematic circuit diagram relevant for the establishing of flux is shown in FIG. 5a. The circuit includes the direct voltage source, Es, and an inductor Ls. The coil of the inductor is energized and carries the current flowing to the terminal 13+ when the main winding 11 is connected between the terminal 13+ and 13−. As the winding 11 carries n0 current, the voltage across the winding of inductor Lx increases and tends to maintain the established MMF in the core of the inductor. The polarity of the voltage across the inductor is given in brackets in FIG. 5a. The instantaneous rise of the voltage across Ls causes the rise of the voltage across the main winding 11 as well as the rise of the voltage across the auxiliary winding 11x. The voltage between the terminals of the auxiliary winding rises till the rectifier pair 11C, 11D is forward biased when the current starts to flow through the auxiliary winding. The auxiliary winding current flows into the +terminal of the winding and produces the flux opposing the flux produced by the main winding current, and yields the rise of the current in the main winding too.

The main and the auxiliary windings start to operate as the transformer. The operation of the phase, while the power is transformed, is determined: by the constant current supplied by the inductor to the main winding, by the voltage between the terminals of the auxiliary winding, (this voltage determines the voltage across the main winding), and by the rising flux excited by the fraction of the main winding current.

The main winding current, as a primary current, is the sum of two currents as follows the exciting current i and the current I compensated by the auxiliary winding current in such a way that it is $Ni - NxIx = 0$.

The exciting current maintains the flux inducing the back electromotive force (EMF) between the terminals of the main winding. It rises in accordance to the above given relations and tends to increase the whole current flowing through the main winding. But the voltage across the inductor is such that it maintains the constant current, and therefore the voltage across the inductor slightly decreases, as well as the voltage across the main winding and further across the auxiliary winding. This causes the rectifier pair to be forward biased in such a way that the rectifiers carry the auxiliary winding current compensating the difference between the inductor current and the established exciting current in the main winding immediately. After applying the direct voltage to the main winding the exciting current is zero and the whole current flowing through the main winding is compensated by the auxiliary winding current. The rise of the exciting current depends on the voltage across the main winding, actually on the voltage across the auxiliary winding, and depends on the winding inductance. The exciting current in the main winding increases in the above-described way till the exciting current equals the inductor current. The main winding continues to operate with constant current and without transforming of power by means of the auxiliary winding. The phase current is equal to the exciting current. It is plausible to establish the desired phase current before the rotor has entered the region of rising inductance, because it provides the maximum energy to be converted by the winding for the given current as shown in FIG. 2c. The previously described operation of the phase enables instantaneous establishing of the main winding current of any value.

The current flowing through the external inductor is assumed to be constant. Although the said current changes due to differences between the average value of the voltage of the back EMF, and the average value of the applied voltage. However, the change of the main winding current requires a time longer than a time necessary for establishing the main winding current.

The phases of a group are successively energized by the same direct voltage source and each main winding is connected between the terminals of the source by means of the series connected respective switch. Said switches are conductive one by one and only one at any time. The back electromotive force of the energized main winding is featured by an uneven waveshape, and in the well-known systems the constant current can be obtained only by using a high speed current chopper. The possibility of the instantaneous establishing of the current in the main winding and the timing of the power converter, as described, enable the uninterruptable flow of the current energizing a group of phases. Therefore the current can also flow through an external inductor and/or the same current can energize another group of phases. The additional inductance provides substantial flatness of the energizing current. It compensates the difference between the voltage of the energizing source and the back electromotive force of the energized winding similarly to the operation of a direct current shunt motor with an external inductor powered by means of the conventional controlled rectifiers.

This is the fundamental feature of the drive systems being the subject matter of this invention, and it provides benefits and advantages compared with well-known systems.

The inductance of the additional inductor can be of any high value and the inductor provides the current fluctuations to be within predetermined limits. Therefore the difference between the voltage of the energizing source and the voltage of the back electromotive force can be substantial yielding the benefits of the discussed system.

The direct voltage power supply energizing the VR motor windings can be any of conventional power converters used for energizing of direct current (DC) motors.

A VR motor can be energized by such supply throughout the whole range of speed without excessive current, and this is very useful for the low speed operation. The speed and the torque of a VR motor are related to the voltage and to the current of the energizing power supply respectively and the relationships are similar to the ones featuring the operation of conventional DC motor. Therefore the control of the power supply energizing a VR motor, implementing either the speed feedback loop, or torque feedback loop, or both the speed and torque feedback loops combined, is similar to the corresponding control of the power supply energizing a DC motor. The electrical parameters relevant for the operation of the power supply are the motor speed, the voltage between the terminals of the power supply and the current energizing the motor windings. The energizing current flowing through any one of the main windings is sensed by means of only one current sensor.

The constant current is more easily handled by a switching device than the peak current, especially when the switching device is a transistor. The relevant parameter of the back electromotive force is mostly its average value, and this permits consequently that the operating point of the motor can be in the region of high magnetic saturation where the back EMF is reduced. The saturated motor requires less kVA for the same kW output than the unsaturated one.

In the well-known VR drives the reduced back EMF leads to potential runaway condition featured by the tendency towards a current to be prevented either by commutation or by current chopping. In the system being the subject matter of this invention, the current is maintained under control by adjusting the voltage of the power supply energizing the motor. Therefore the control means rendering the switching devices conductive are related only to the rotor position sensors, not to the value of current flowing through the winding, and accordingly the control means are simple.

As the waveshape of the back EMF mostly does not affect the waveshape of the energizing current, the design of a VR motor concerns primarily the magnetization curves determining the desired converted and the stored energy. In the case of a three phase VR motor, as well as in the case of two phase VR motor, the phases compose one group and the schematic circuit diagram for energizing a three phase motor is shown in FIG. 6a. The circuit includes the main windings 11, 22 and 33 and series connected respective switches S1, S2 and S3, adjustable power supply Es with its terminals S+ and S−, and the inductor Ls.

The power supply Es can be any one of the well-known power supplies producing adjustable unidirectional voltage between its output terminal pair. Between the terminals S+ and S- the current flows constantly. When the mechanical load is constant then the change of the average voltage between the terminals of the power supply is substantially proportional to the change of speed. The waveshape of the currents flowing through the main windings are illustrated in FIGS. 7A., 7b. and 7c. respectively, together with the respective inductance curves.

Figure 8B:
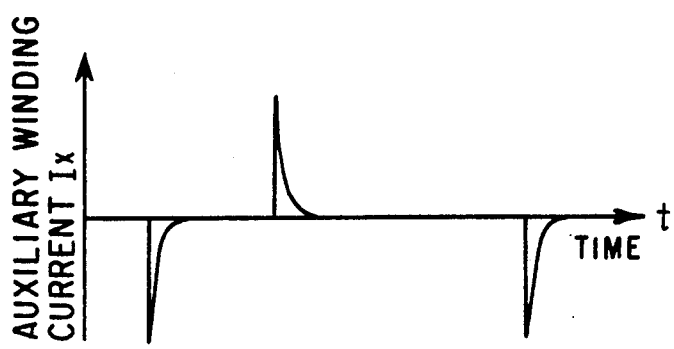

The waveshape of a main winding current is shown in 8a. and the waveshape of the accompanied auxiliary winding current is shown in FIG. 8b. Shown current waveshapes feature the drives having other number of phases as well.

Each auxiliary winding is accompanied by the rectifier, but the rectifiers can be connected in different ways. Two examples are shown in FIG. 6b. and 6d. respectively. Both circuits provide energy flow from the auxiliary windings to the direct voltage power supply, called dump source, having one pair of terminals, the positive, D+, and the negative one, D−.

The circuit shown in FIG. 6b. includes the auxiliary windings 11x, 22x and 33x and accompanied rectifiers shown as single block R1, R2 and R3. It includes the capacitor Cd when the appropriate dump source is not at disposal, and the capacitor is called a dump capacitor. The shown circuit is suitable for the case when the source featuring bilateral energy flow for a certain value of the voltage between its terminals, is at disposal, this is the case when the motor is battery operated, otherwise the capacitor Cd operates as the dump source and the energy stored in the capacitor is recycled back into the motor. Immediately, after commutation, i.e. switching-on, two auxiliary windings carry a current and both currents flow into the dump source The circuits, shown in FIG. 6a. and 6b. compose the control circuit for three phase VR motor. The circuits, shown in FIG. 6a., 6c. and 6d. also compose a control circuit for a three phase VR motor. The circuit shown in FIG. 6d. includes the auxiliary windings 11x, 22x and 33x, together with respective rectifiers R1, R2 and R3, connected in such a way that the same current flows through any two, of three, auxiliary windings after each commutation, and the voltage between the positive, D+, and the negative, D−, terminal is approximately the algebraic sum of the absolute value of the voltages across two auxiliary windings carrying current.

The accompanying rectifiers R1, R2 and R3 provide that the current flows only through an auxiliary winding grasping the variable flux, interrelated to the change of the current in the accompanied main winding. Otherwise, said rectifiers provide that the current flowing through another auxiliary winding doesn't influence non-energized auxiliary windings.

The fundamental feature of the circuit, as shown in FIG. 6d., is that the current flowing into the dump capacitor immediately after the commutation is only one half of the current flowing into the dump source when the same VR motor is equipped with the circuit as shown in FIG. 6b. When the number of turns of the main winding is either smaller than or equal to the number of turns of the auxiliary winding, then the returning current flowing into the dump capacitor is either smaller than or equal to the energizing current flowing between the terminals S+ and S−, shown in FIG. 6a. Therefore the current discharging the dump capacitor can be directed to flow between the terminals S+ and S−, shown in FIG. 6a., either as the fraction or the whole energizing current. The voltage across the capacitor Cd is maintained within certain predetermined limits.

As the returning current flows into the capacitor Cd, the voltage across said capacitor rises and when it exceeds the predetermined value the capacitor is discharged in the previously described way. The discharging circuit is a kind of step-down direct-to-direct-voltage (SD) converter triggered by the voltage across the dump capacitor Cd. The (SD)converter is shown in FIG. 6c. as the black box with its input, D+ and D−, and output, S+ and S-, terminals. The input terminals, D+ and D−, of the SD converter are connected to terminals D+ and D− of the dump source, shown in FIG. 6d, and the output terminals of the SD converter, S+ and S−, are connected to the terminals of the power supply shown in FIG. 6a., S+ and S−, respectively. The constant demand for the current between the terminals the power supply, S+ and S−, shown in FIG. 6a, enables that the capacitor Cd can be discharged without storing substantial amount of energy in the capacitor, in the case when the turns ratio provides it. This yields that the capacitor is used primarily for transfer of energy, not for storing substantial amounts of energy. Therefore the dump capacitor is not necessarily to be the electrolytic one featuring high voltage and high capacitance rated values.

This is further benefit and advantage of the invention compared with well-known VR motor drive systems, because a VR motor drive system can be designed in such a way that it doesn't require electrolytic capacitor(s) which are indispensatle in the case of the well-known systems.

Further, the voltage across the dump capacitor is electronically controlled and it can be maintained at a voltage level providing quick discharging of energy of one phase and quick establishing of the resultant MMF of the other phase.

The phases of a four phase VR motor can compose two groups. One group comprises the windings 11 and 33, the other one comprises the windings 22 and 44 whose idealized waveshapes of winding inductances are given in FIG. 9d. to 9g. For any rotor position, each group includes a winding whereof the inductance substantially rises. The windings 11, 22, 33 and 44 are series connected with the switches S1, S2, S3 and S4 respectively. Each main winding of a group is connected by means of the respective series switch between the same pair of energizing terminals and the equivalent circuit between the said terminals and is called equivalent branch of the group. Two equivalent branches are series connected between the positive, S+ and the negative, S−, terminals of the direct voltage power supply Es as shown in FIG. 9a. The power supply Es can be any conventional power source providing adjustable direct voltage between its pair of terminals.

Figure 9D:
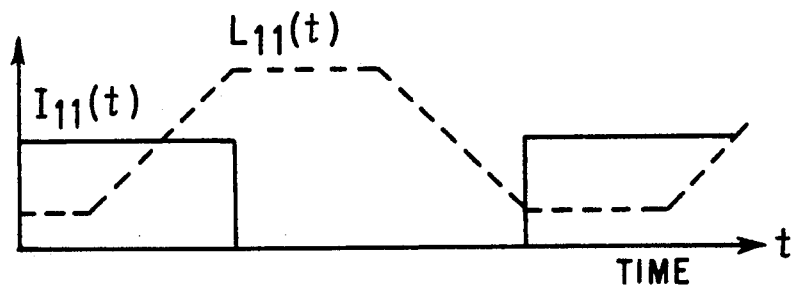
Figure 9E:
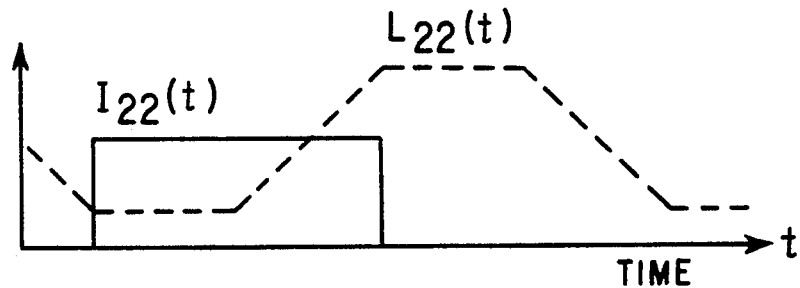
Figure 9F:
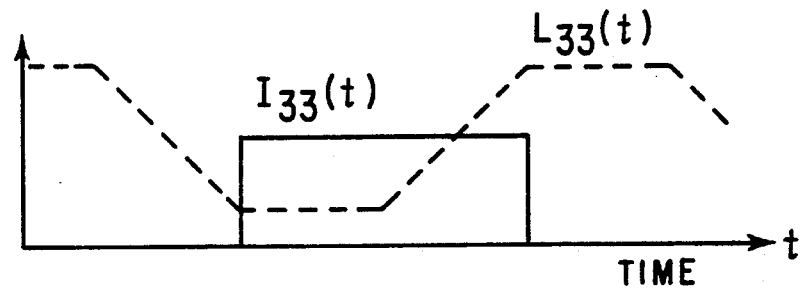
Figure 9G:
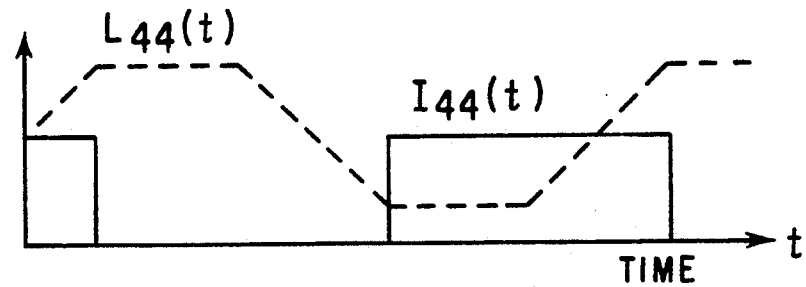

As the current continually flows between the terminals and energizes two groups of phases, the same current can flow through an additional external inductor. In this case two equivalent branches and the additional inductor are effectively series connected. Therefore, the power converter energizing the phases of four phase motor may take various forms and the schematic circuit diagram shown in FIG. 9a. is one example of the embodiment of the circuit for energizing the main windings of four phase motor, where only two equivalent branches are series connected between the terminals of the energizing power supply. The operation of the circuit, shown in FIG. 9a., is determined by the magnitude of the voltage of the power supply, by the algebraic sum of the back EMFs of two energized main windings and by the sum of the inductances of two main windings carrying the same energizing current. The algebraic sum of the back EMFs for the VR motor having the winding inductances as shown in FIGS. 9d. to 9g., with the linear rise of the winding inductances, is a flat topped curve, which is the ideal case for the power supply producing ideally flat direct voltage. In the real world the motor having such winding inductance curve usually differs from the given one, but the sum of inductances of the windings carrying energizing current, as well as the less uneven back EMF of two series connected main windings provide substantially constant current operation of the motor. Installing an additional inductor, effectively series connected with the other equivalent branches, reduces the fluctuations of the energizing current and the inductance of the additional inductor can be of any high value providing the current fluctuations to be within the predetermined limits.

The circuit, shown in FIG. 9b., provides energy flow from the auxiliary windings of a four phase VR motor. It includes auxiliary windings 11x, 22x, 33x i 44x, together with respective rectifiers R1, R2, R3 and R4 providing the energy transfer from the auxiliary windings to the dump source having terminals the positive, D+, and the negative one, D−, shown as well.

The circuit, shown in FIG. 9c., provides the same operation as the circuit, shown in FIG. 9b., and it includes the auxiliary windings 11x, 22x, 33x and 44x together with the rectifiers R1 and R2 corresponding to two groups of phases respectively, and further includes the positive terminal, D+, and the negative one, D−, of the dump source. The section of the circuit concerning the operation of a group, said section includes the auxiliary windings 11x and 33x, the rectifier R1 and the dump source terminals D+ and D−, is the example how the auxiliary windings of a group of phases, when the group is composed of two phases, can be connected through only one rectifier with the dump source.

When the number of turns of the main winding is equal to the number of turns of the auxiliary winding, than the returning current immediately after commutation is equal to the current flowing between the terminals of direct voltage supply, shown in FIG. 9a. and thereafter decreases to zero. The voltage between the terminals of the auxiliary winding in this case is either smaller than or equal to the voltage between the terminals S+ and S− of the power supply Es energizing the main windings, as shown in FIG. 9a. In such case the terminals of the power supply S+ and S−, shown in FIG. 9a., can also be the terminals of the dump source, D+ and D− respectively, it means that the terminals, S+ and S−, shown in FIG. 9a. can be directly connected to the terminals of the dump source, D+ and D− respectively, whichever embodiment is chosen, either the circuit shown in FIG. 9b. or the shown in FIG. 9c.

The fundamental features, benefits and advantages of the above-described drive is that it includes no capacitors for energy storing and, it is mostly constant current supplied without additional inductor.

The operation of the drive without a capacitor provides less energy losses due to capacitor losses and due to energy transfer into and out of the capacitor.

The switching means in the case of a four phase motor can be the construction whose schematic end view is shown in FIG. 10. It includes an electrical insulator 5 mounted and fixed on the motor shaft. The switching slip-ring is comprised of the electrically conductive section 6, represented in figure 10 as the hatched area 6, fixed to the insulator 5, and of six electrically non-conductive segments 7a., 7b., 7c., 7d., 7e. and 7f. The elements 5 and 6 together with 7a. to 7f. rotate with the rotor. Brush holders BH1, BH2, BH3 and BH4 are fixed on the stator housing and electrically insulated. The brushes S1, S2, S3 and S4 are the brushes used in a conventional brush motors and each brush is connected to the respective main winding. Each brush is in contact with the conductive segment 6 periodically and at any rotor position one of the brushes of the pair S1 and S3, and one of the brushes of the pair S2 and S4, is in contact with the conductive segment 6. The angular position of each nonconductive segment, and the position of each one of the brush holders is chosen in such a way that each brush has contact with the conductive area 6 while the inductance of the respective main winding, connected to said brush, substantially increases with the movement of the rotor in the given direction.

When the brushes S1, S2, S3 and S4 are connected by means of wires B1, B2, B3 and B4, respectively, to one terminal of the main windings 11, 22, 33 and 44 in respective order, as shown in FIG. 10; and when the other sides of the winding 11 and 33 are connected to the positive terminal of the energizing direct voltage power supply, and when the other sides of the windings 22 and 44 are connected to the negative terminal of said power supply, as shown in FIG. 10, than the energizing current flowing through either 11 or 33 main winding, and flowing through either 22 or 44 main winding excites the flux producing the torque supporting the clockwise rotation of the illustrated motor.

The switching slip-ring eliminates the need for the solid state switches. When the terminals of dump source are directly connected to the terminals of the energizing source, as previously described, and when the rectifiers accompanying the auxiliary windings are mounted on the stator housing, than a four phase VR motor equipped with switching slip-ring is connected to the energizing power supply by means of only two wires.

Although the invention has been described in detail in the foregoing embodiments for the purpose .of illustration, it is to be understood that such detail is solely for that purpose and that variations can be made therein by those skilled in the art without departing from the spirit and scope of the invention except as it may be described by the following claims.

What is claimed is:

1. A method of establishing an induced flux in a phase of a variable reluctance motor comprising the steps of:
    (1) applying a source voltage to a main winding carrying no current at a rotor position switch-on point by connecting, respectively, source terminals of the source voltage to main winding terminals;
    said switch-on point being predetermined in such a way that a winding inductance remains substantially unchanged, with no current in the main winding prior to applying the source voltage to it, causing essentially instantaneous increasing of the source voltage after its application to the main winding, said increase of the source voltage causes increases of the induced voltage between terminals of an auxiliary winding magnetically coupled to said main winding, said increase of the induced voltage between the terminals of the auxiliary winding magnetically coupled to said main winding, said increase of the induced voltage between the terminals of the auxiliary winding causes essentially instantaneous establishment of the auxiliary winding current as well as essentially instantaneous establishment of the current in the main winding compensating said auxiliary winding current, said change of the source voltage at the switch-on position causes the main winding current to have said predetermined magnitude; and (2) maintaining the connection between the source terminals and respective main winding terminals with no brakes until the auxiliary winding current decreases to zero;

said source voltage applied to the main winding corresponding to the increase of an induced flux produced by the fraction of the main winding current called exciting current, said increase of the induced flux corresponding to the voltage between the terminals of the auxiliary winding and said source voltage applied to the main winding causing the increase of the exciting current from zero at step (1) of the method to a predetermined magnitude, said increase of the exciting current causing the tendency towards the increase of the current in the main winding and causing the decrease of the source voltage and further causing the decrease of the induced voltage between the terminals of the auxiliary winding and also causing the decrease of the auxiliary winding current from the value compensating the predetermined magnitude at step (1) to zero, said decrease of the auxiliary main winding current compensated by the auxiliary winding current from the value equal to said predetermined magnitude at step (1) to zero with the decrease of the source voltage causing the main winding current to have said predetermined magnitude during the establishment of the flux.

2. An electric drive system comprising:

a variable reluctance motor having n phases, where n is greater than 1 and is an integer and where each phase has associated with it a main winding and magnetically coupled to it an auxiliary winding; a rotor in proximity to the main and auxiliary winding having for any rotor position at least one phase wherein inductance of the winding increases with the movement of the rotor in a given direction;

a direct voltage power supply having a first and a second terminal energizing the motor and providing uni-polar voltage between its two terminals;

an inductor having two terminals wherein the first terminal is connected to the first terminal of said direct-voltage power supply;

plurality of switching means corresponding respectively to said motor phases;

circuit means for applying uni-polar energizing voltages to each main winding including one pair of terminals wherein one terminal is connected to the second terminal of said inductor nd the other terminal of said pair is connected to the second terminal of said direct-voltage power supply, between the terminals of said pair are connected the main windings of the phases and the respective switching means in such a way that one terminal of the main winding of a phase is connected to the first terminal of said terminal pair, the second terminal of said main winding is connected to one terminal of the respective switching means, and the other terminal of said switching means is connected to the other terminal of said terminal pair;

a direct voltage power supply which acts as a sink for the current carried by the corresponding auxiliary winding, the supply is called a dump source and is equipped with one pair of terminals, a positive and a negative one; and circuit means associated with each auxiliary winding respectively and enabling energy flow from the auxiliary winding to the corresponding dump source, where the circuit means includes two pairs of uncontrolled rectifiers; the first one whose cathodes are connected to the positive terminal of the corresponding dump source and whose anodes are connected to the terminals of the auxiliary winding respectively, and the second pair whose anodes are connected to the negative terminal of the corresponding dump source and whose cathodes are connected to the terminals of the auxiliary winding respectively, whereby said switching means corresponding to the motor phase are conductive one by one and only one at a time, each one is conductive during energization intervals starting at a rotor position where the respective winding inductance is substantially at its minimum and ending at the rotor position where the winding inductance of the other phase is substantially at its minimum and it is to be energized.

3. A system as claimed in claim 2 wherein all of said switching means are solid-state, said system comprising control means responsive to the instantaneous position of the rotor for rendering said solid-state switching means conductive during energization intervals.

4. A variable reluctance motor having two phases where each phase has associated with it a main winding and magnetically coupled to it an auxiliary winding; a rotor in proximity to the main and auxiliary winding having for any rotor position one phase wherein inductance of the winding increases with the movement of the rotor in a given direction;

a direct voltage power supply having a first and a second terminal, energizing the motor and providing uni-polar voltage between its terminals;

an inductor having two terminals wherein the first terminal is connected to the first terminal of said direct-voltage power supply;

two switching means corresponding respectively to said motor phase;

circuit means for applying uni-polar energizing voltages to each main winding including:

one pair of terminals wherein one terminal is connected to the second terminal of said inductor and the other terminal of said pair is connected to the second terminal of said direct-voltage power supply, between the terminals of said pair are connected the main windings of the phases and the respective switching means in such a way that one terminal of the main winding of a phase is connected to the first terminal of said terminal pair, the second terminal of said main winding is connected to one terminal o the respective switching means, and the other terminal of said switching means is connected to the other terminal of said terminal pair;

a direct voltage power supply which acts as a sink for the current carried by the auxiliary windings, the supply is called a dump source and is equipped with one pair of terminals, a positive and a negative one; and circuit means associated with the auxiliary windings of the phase, enabling energy flow from the auxiliary windings to said dump source, where said circuit means includes two pairs of uncontrolled rectifiers; the first one whose cathodes are connected to the positive terminal of the dump source and whose anodes are connected respectively to the first terminal of the auxiliary winding of the first phase and to the first terminal of the auxiliary winding of the second phase, and the second pair of uncontrolled rectifiers whose anodes are connected to the negative terminal of the dump source and whose cathodes are connected, respectively to the anodes of the uncontrolled rectifiers of the first pair of uncontrolled rectifiers, where the second terminal o the auxiliary winding of said first phase is connected to the second terminal of the auxiliary winding of said second phase, where the current flowing through both auxiliary windings produces in one auxiliary winding induced flux supporting induced flux produced by the current carried by the respective main winding, and produces in the other auxiliary winding induced flux opposing induced flux produced by the current carried by the main winding respective to said other auxiliary winding;

whereby said switching means corresponding to the motor phases are conductive one by one and only one at a time, each one is conductive during the energization intervals starting at a rotor position where the respective winding inductance is substantially at its minimum and ending at the rotor position where the winding inductance of the other phase is substantially at its minimum and it is to be energized.

5. A system as claimed in claim 4 wherein all of said switching means are solid-state, said system comprising control means responsive to the instantaneous position of the rotor for rendering said solid-state switching means conductive during energization intervals.

6. An electrical drive system comprising:

a variable reluctance motor having two pairs of phases, each phase has associated with it a main winding and magnetically coupled to it an auxiliary winding; a rotor in proximity to the main and auxiliary winding having for any rotor position at least one phase wherein winding inductance increases with movement of the rotor in a given direction and also having for any rotor position at least one phase wherein t he winding inductance decreases with movement of the rotor in said direction, and where for any rotor position each pair of phases includes one phase wherein its winding inductance substantially increases with movement of the rotor in said direction;

a power supply called a source providing uni-polar energizing voltage between its positive and negative terminal;

circuit means comprising four switching means corresponding respectively to the motor phases for applying uni-polar energizing voltages to the main windings of the motor phase under control of only one switching means for each phase during energization intervals, said intervals corresponding to the rotor positions wherein the energized phase substantially produce a torque supporting desired movement of the rotor;

said circuit means also comprising two pairs of terminals corresponding respectively to said pairs of phases where said pairs of terminals are connected in such a way that the first terminal of the first pair is connected to the positive terminal of the source, the second terminal o the first pair is connected to the first terminal of the second pair of terminals and the second terminal of the second pair is connected to the negative terminal of the source and where the main windings of one pair of phases and the respective pair of terminals are connected in such a way that one terminal of a main winding is connected to one terminal of said pair of terminals, the other terminal of said main winding is connected to one terminal of the respective switching mean, the other terminal of said switching means is connected to the other terminal of said pair of terminals;

circuit means for the transfer of energy from the auxiliary windings of the motor phases, said circuit means comprising for each phase of the motor a respective full-wave rectifier such that there is a first and a second full-wave rectifier, each full-wave rectifier including a first pair of uncontrolled rectifiers whose cathodes are interconnected and including a second pair of uncontrolled rectifiers whose anodes are interconnected; the cathodes of the second pair of uncontrolled rectifiers being respectively connected to the anodes of the first pair of uncontrolled rectifiers, said auxiliary winding of the phase corresponding to said full wave rectifier being connected respectively to the anodes of said first pair of uncontrolled rectifiers, said first and said second full-wave rectifier are connected in such a way that the cathodes of the first pair of uncontrolled rectifiers of the first full-wave rectifiers are connected to the positive terminal of the source, and that the anodes o the second pair of uncontrolled rectifiers o the second full-wave rectifiers are connected to the cathodes of the first pair of the second full-wave rectifiers and the anodes of the second pair of uncontrolled rectifiers of the second full-wave rectifiers are connected to the negative terminal of the source, wherein each main winding is supplied with energizing current during energization intervals in such a way that each energization interval of a phase starts at a rotor position where the winding inductance of the phase is substantially at its minimum and ends at a rotor position, called commutation point, where the winding inductance of the other phase of the same pair of phases is substantially at its minimum;

whereby each main winding carries uni-polar current while energizing voltage is applied to it and the auxiliary winding of a phase carries a current after applying energizing voltage to the main winding while induced flux which is produced by currents carried by the main and by the auxiliary winding, increases from zero to the value which is produced only by the main winding current, and the auxiliary winding of a phase carries a current after commutation point while induced flux decreases from the value which is established by the main winding current to zero.

7. A system as claimed in claim 6 wherein all of said switching means are solid-state, said system comprising contact means responsive to the instantaneous position of the rotor for rendering said solid-state switching means conductive during energization intervals.

8. An electrical drive system comprising:

a variable reluctance motor having two pairs of phases, each phase having associated with it a main winding and magnetically coupled to it an auxiliary winding; a rotor in proximity to the main and auxiliary winding having for any rotor position at least one phase wherein winding inductance increases with movement of the rotor in a given direction and also having for any rotor position at least one phase wherein winding inductance decreases with movement of the rotor in said direction, and where for any rotor position each air of phases includes one phase wherein its winding inductance substantially increases with movement of the rotor in said direction;

a power supply called a source providing uni-polar energizing voltage between its positive and negative terminal;

circuit means comprising fours switching means corresponding respectively to the motor phase for applying uni-polar energizing voltages t the main windings of the motor phases under control of only one switching means or each phase during energization intervals, said intervals corresponding to the rotor positions wherein the energized phase substantially produce a torque supporting desired movement of the rotor; said circuit means also comprising two airs o terminals corresponding respectively to said pairs of phase where said pairs of terminals are connected in such a way that the first terminal of the first pair is connected to the positive terminal of the source, the second terminal o the first pair is connected to the first terminal of the second pair of terminals and the second terminal of the second pair is connected to the negative terminal of the source and here the main windings of one pair of phases and the respective pair of terminals are connected in such a way that one terminal of a main winding is connected to one terminal of said pair of terminals, the other terminal of said main winding is connected to one terminal of the respective switching means, the other terminal of said switching means is connected to the other terminal of said pair of terminals;

circuit means for transferring energy from the auxiliary windings of the motor phases, said transferring energy circuit means comprising for each pair of phases a respective full-wave rectifier where said full-wave rectifier includes two pairs of uncontrolled rectifiers connected in such a way that the cathodes of the first pair are connected to the positive terminal of the source, the anodes of the first pair are connected, respectively, to the anodes o the second pair of uncontrolled rectifiers, the anodes of the second pair are connected to the negative terminal of the source, the auxiliary windings of the pair of phases corresponding to said full-wave rectifiers are connected in such a way that one terminal of the first and one terminal of the second auxiliary winding are connected respectively to the anodes of said first pair of uncontrolled rectifiers and that the other terminals of said first and second auxiliary winding are interconnected to each other, whereby the current flowing through both of said auxiliary windings produces in one auxiliary winding induced flux supporting the induced flux produced by the current carried by the respective main winding, and produced in the other auxiliary winding induced flux opposing the induced flux produced by the current carried by the main winding respective to said other auxiliary winding;

wherein each main winding is supplied with energizing current during energization intervals in such a way that each energization interval of a phase starts at a rotor position where the windings inductance of the phase is substantially at its minimum and ends at a rotor position, called commutation point, where the winding inductance of the other phase of the same pair of phase is substantially at its minimum; and whereby each main winding carries a uni-polar current while energizing voltage is applied to its and the auxiliary winding of a phase carries a current after applying energizing voltage to the main winding while induced flux which is produced by currents carried by the main and by the auxiliary winding, increases from zero to the value which is produced only by the main winding current, an the auxiliary winding of a phase carries a current after commutation point while induced flux decreases from the value which is established by the main winding current to zero.

9. An electrical drive system comprising:

a variable reluctance motor having two pairs of phases, each phase has associated with it a main winding and magnetically coupled to it an auxiliary winding; a rotor in proximity to the main and auxiliary winding having for any rotor position at least one phase wherein the winding inductance increases with movement of the rotor in a given direction and also having for any rotor position at least one phase wherein the winding inductance decreases with movement of the rotor in said direction, and where for any rotor position each pair of phase includes one phase wherein its winding inductance substantially increases with movement of the rotor in said direction;

a power supply providing uni-polar energizing voltage between its positive and negative terminal;

means for applying uni-polar energizing voltages to the main windings of the motor phase during energization intervals, said intervals corresponding to the rotor positions wherein the energized phase substantially produce a torque supporting desired movement of the rotor;

said applying means comprising:

four electrically conductive brushes placed in the brush-holders which re disposed in proximity to the stator housing and electrically insulated from it, said brushes corresponding respectively to the motor phases, comprising further the switching slip-ring mounted on the rotor and rotating together with the rotor, said switching slip-ring being composed of an electrically conductive section positioned about the rotor shaft and electrically insulated from the rotor, and six electrically non-conductive segments disposed in the electrically conductive section and positioned circumferentially about the rotor shaft, each brush slipping circumferentially along the ring and having electrical contact with said electrically conductive section while the winding inductance of the respective phase substantially increase with the movement of the rotor;

wherein terminals o the main windings of the first pair of phases are connected in such a way that one terminal of a main winding is connected to the positive terminal of the power supply and the other terminal of a main winding is connected to the respective brush, and wherein terminals of the main windings of the second pair of phases are connected in such a way that one terminal of a main winding is connected to the negative terminal of the power supply and other terminal of said main winding is connected to the respective brush;

circuit means for the transfer of energy from the auxiliary windings of the motor phases, said circuit means comprising for each phase of the motor a respective full-wave rectifier, each full-wave rectifier including a first pair of uncontrolled rectifiers whose cathodes are interconnected, and a second pair of uncontrolled rectifiers whose anodes are interconnected; the cathodes o the second pair of uncontrolled rectifiers being respectively connected to the anodes of the first pair of uncontrolled rectifiers, said auxiliary winding of the phase corresponding to said full wave rectifier being connected respectively to the anodes of said first pair of uncontrolled rectifiers, said first and said second full-wave rectifiers are connected in such a way that cathodes of a first pair of uncontrolled rectifiers of the first full-wave rectifier are connected to the positive terminal of the power supply and that anodes of a second pair of uncontrolled rectifiers of the first full-wave rectifiers are connected to the cathodes of the first pair of the second full-wave rectifiers and the anodes of the second pair of uncontrolled rectifiers of the second full-wave rectifiers are connected to the negative terminal of the power supply, wherein each main winding is supplied with energizing current during energization intervals in such a way that each energization interval of a phase starts at a rotor position where the winding inductance of the phase is substantially at its minimum and ends at a rotor position, called commutation point, where the winding inductance of the other phase of the same pair of phases is substantially at its minimum; and whereby each main winding carries a uni-polar current while energizing voltage is applied to it and the auxiliary winding of a phase carries a current after applying energizing voltage to the main winding while induced flux which is produced by currents carried by the main and by the auxiliary winding, increases from zero to the value which is produced only by the main winding current, and the auxiliary winding of a phase carries a current after commutation point while induced flux decreased from the value which is established by the main winding current to zero.

10. An electrical drive system comprising:

a variable reluctance motor having two pair of phases, each phase having associated with it a main winding and magnetically coupled to it an auxiliary winding; a rotor in proximity to the main and auxiliary winding having for any rotor position at least one phase wherein the winding inductance increases with movement of the rotor in a given direction and also having for any rotor position at least one phase wherein the winding inductance decreases with movement of the rotor in said direction, and where for any rotor position each pair of phases includes one phase wherein its winding inductance substantially increases with movement of the rotor in said direction;

a power supply providing uni-polar energizing voltage between its positive and negative terminal;

means for applying uni-polar energizing voltages to the main windings of the motor phases during energization intervals, said intervals corresponding to the rotor positions wherein the energized phases substantially produce a torque supporting desired movement of the rotor;

said means comprising:

four electrically conductive brushes placed in the brush-holders which are disposed in proximity to the stator housing and electrically insulated from it, said brushes corresponding respectively to the motor phase, comprising further the switching slip-ring mounted on the rotor and rotating together with the rotor, said switching slip-ring being composed of an electrically conductive section positioned about the rotor shaft and electrically insulated from the rotor, and six electrically non-conductive segments disposed in the electrically conductive section and positioned circumferentially about the rotor shaft, each brush slipping circumferentially along the ring and having electrical contact with said electrically conductive section while the winding inductance of the respective phase substantially increases wit the movement of the rotor;

wherein the terminals of the main windings of the first pair of phases are connected in such a way that one terminal of a main winding is connected to the positive terminal of the power supply and the other terminal of a main winding is connected to the respective brush, and wherein the terminals of the main windings of the second pair of phases are connected in such a way that one terminal of a main winding is connected to the negative terminal of the power supply and the other terminal of said main winding is connected to the respective brush;

circuit means for transferring energy from the auxiliary windings o the motor phases, said circuit means comprising for each pair of phases a respective full-wave rectifier where said full-wave rectifier includes two pairs of uncontrolled rectifiers connected in such a way that cathodes of the first pair are connected to the positive terminal of the power supply, the anodes of the first pair are connected, respectively, to the anodes of the second pair of uncontrolled rectifiers, the anodes of the second pair are connected to the negative terminal of the power supply, the auxiliary windings of the pair of phase corresponding to said full-wave rectifiers are connected in such a way that one terminal of the first and one terminal of the second auxiliary winding are connected respectively to the anodes of said first pair of uncontrolled rectifiers and that the other terminals of said first and second auxiliary winding are interconnected to each other, whereby the current flowing through both of said auxiliary windings produces in one auxiliary winding induced flux supporting the induced flux produced by the current carried by the respective main winding, and produced in the other auxiliary winding induced flux opposing the induced flux produced by the current carried by the main winding respective to said other auxiliary winding; where each main winding is supplied with energizing current during energization intervals in such a way that each energization interval of a phase starts at a rotor position where the winding inductance of the phase is substantially at its minimum and ends at a rotor position, called commutation point, where the winding inductance of the other phase of the same pair of phases is substantially at its minimum; and whereby each main winding carries a uni-polar current while energizing voltage is applied to it and the auxiliary winding of a phase carries a current after applying energizing voltage to the main winding while induced flux which is produced by currents carried by the main and by the auxiliary winding, increases from zero to the value which is produced only by the main winding current, nd the auxiliary winding of a phase carries a current after commutation point while induced flux decreases from the value which is established by the main winding current to zero.

* * * * *